United States Patent
Hayashi et al.

(10) Patent No.: US 7,545,547 B2
(45) Date of Patent: Jun. 9, 2009

(54) SCANNING UNIT AND IMAGE FORMING APPARATUS

(75) Inventors: Yoshinori Hayashi, Kanagawa (JP); Nobuaki Kubo, Tokyo (JP); Naoto Watanabe, Kanagawa (JP); Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 11/877,020

(22) Filed: Oct. 23, 2007

(65) Prior Publication Data

US 2008/0100895 A1 May 1, 2008

(30) Foreign Application Priority Data

Oct. 25, 2006 (JP) ............................. 2006-290030

(51) Int. Cl.
*G02B 26/08* (2006.01)

(52) U.S. Cl. ....................................... 359/204; 347/243

(58) Field of Classification Search ................... 359/204
See application file for complete search history.

(56) References Cited

U.S. PATENT DOCUMENTS

| | | | |
|---|---|---|---|
| 6,104,522 A | 8/2000 | Hayashi et al. |
| 6,977,762 B2 | 12/2005 | Hayashi |
| 7,050,210 B2 | 5/2006 | Atsuumi et al. |
| 7,106,483 B2 | 9/2006 | Hayashi et al. |
| 7,145,705 B2 | 12/2006 | Hayashi |
| 7,154,651 B2 | 12/2006 | Atsuumi et al. |
| 7,164,516 B2 | 1/2007 | Hayashi et al. |
| 7,218,432 B2 | 5/2007 | Ichii et al. |
| 7,233,425 B2 | 6/2007 | Hayashi |
| 7,236,281 B2 | 6/2007 | Hayashi et al. |
| 7,253,937 B2 | 8/2007 | Ueda et al. |
| 7,271,823 B2 | 9/2007 | Izumi et al. |
| 2006/0000990 A1 | 1/2006 | Hayashi et al. |
| 2006/0077500 A1 | 4/2006 | Hayashi et al. |
| 2006/0232659 A1 | 10/2006 | Hayashi et al. |
| 2006/0284968 A1 | 12/2006 | Hayashi et al. |
| 2007/0081217 A1 | 4/2007 | Hayashi et al. |
| 2007/0206261 A1 | 9/2007 | Hayashi et al. |

(Continued)

FOREIGN PATENT DOCUMENTS

JP 10-301044 11/1998

(Continued)

OTHER PUBLICATIONS

U.S. Appl. No. 11/782,268, filed Jul. 27, 2007, Ichii, et al.

(Continued)

*Primary Examiner*—James Phan
(74) *Attorney, Agent, or Firm*—Oblon, Spivak, McClelland, Maier & Neustadt, P.C.

(57) ABSTRACT

A scanning optical system leads the light fluxes deflected by the polygon mirror to a photosensitive drum. An absolute value of a lateral magnification in a main scanning direction is larger than an absolute value of a lateral magnification in a sub-scanning direction. Moreover, a beam diameter in the sub-scanning direction on a surface of the photosensitive drum is equal to or smaller than a beam diameter in the main scanning direction and larger than a scan line interval.

10 Claims, 10 Drawing Sheets

U.S. PATENT DOCUMENTS

2007/0211325 A1  9/2007  Ichii
2007/0253048 A1* 11/2007  Sakai et al. .................. 359/204

FOREIGN PATENT DOCUMENTS

JP     2004-287292   10/2004
JP     2005-250319   9/2005

OTHER PUBLICATIONS

U.S. Appl. No. 11/844,643, filed Aug. 24, 2007, Saisho, et al.
U.S. Appl. No. 11/873,635, filed Oct. 17, 2007, Hayashi, et al.
U.S. Appl. No. 11/877,020, filed Oct. 23, 2007, Hayashi, et al.
U.S. Appl. No. 12/186,808, filed Aug. 6, 2008, Watanabe, et al.
U.S. Appl. No. 12/190,182, filed Aug. 12, 2008, Ichii et al.

* cited by examiner

| IMAGE HEIGHT [mm] | BEAM DIAMETER [μm] | |
| --- | --- | --- |
| | MAIN SCANNING DIRECTION | SUB-SCANNING DIRECTION |
| -161.5 | 52.7 | 43.1 |
| -150.0 | 52.5 | 43.0 |
| -100.0 | 52.9 | 43.0 |
| -50.0 | 52.4 | 42.7 |
| 0.0 | 52.2 | 42.5 |
| 50.0 | 52.5 | 43.0 |
| 100.0 | 53.1 | 43.0 |
| 150.0 | 52.5 | 43.0 |
| 161.5 | 52.7 | 43.2 |

FIG.11
| IMAGE HEIGHT [mm] | BEAM DIAMETER [μm] | |
|---|---|---|
| | MAIN SCANNING DIRECTION | SUB-SCANNING DIRECTION |
| -161.5 | 51.3 | 68.5 |
| -150.0 | 51.3 | 68.5 |
| -100.0 | 51.8 | 68.6 |
| -50.0 | 51.9 | 68.6 |
| 0.0 | 52.0 | 68.5 |
| 50.0 | 51.9 | 68.6 |
| 100.0 | 51.9 | 68.6 |
| 150.0 | 51.3 | 68.7 |
| 161.5 | 51.3 | 68.8 |
FIG.12A
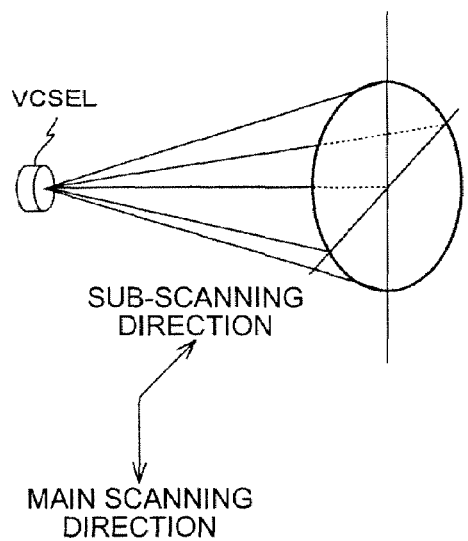
FIG.12B
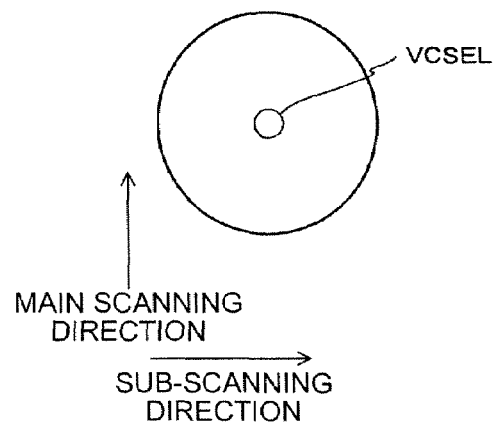

FIG.15

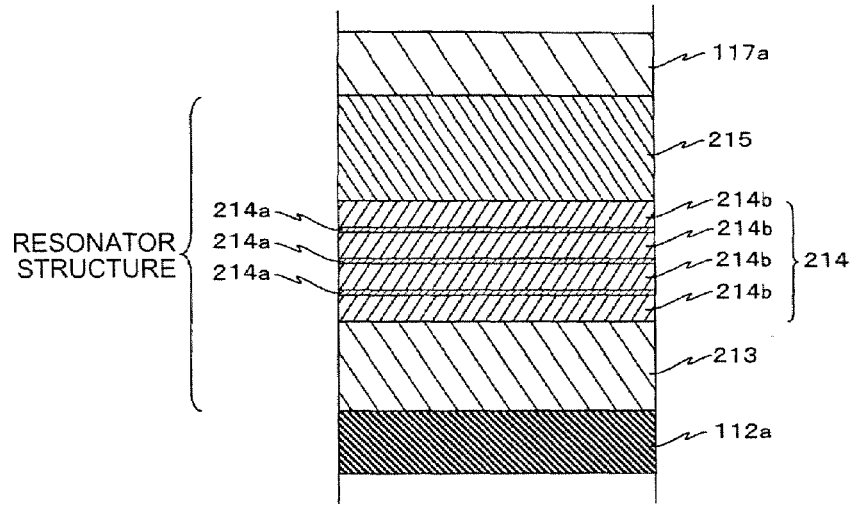

FIG.16

| WAVELENGTH BAND | 780 [nm] | | 850 [nm] (Ref.) |
|---|---|---|---|
| MATERIAL SYSTEM OF SPACER LAYER/ QUANTUM WELL LAYER | AlGaAs/AlGaAs | AlGaInP/GaInPAs | AlGaAs/GaAs |
| SPACER LAYER | $Al_{0.6}Ga_{0.4}As$ (Eg=2.0226 [eV]) | $(Al_xGa_{1-x})_{0.5}In_{0.5}P$ (Eg(x=0.7)=2.324 [eV]) | $Al_{0.6}Ga_{0.4}As$ (Eg=2.0226 [eV]) |
| ACTIVE LAYER — QUANTUM WELL LAYER | $Al_{0.12}Ga_{0.88}As$ (Eg=1.5567 [eV]) | GaInPAs (COMPRESSION STRAIN) (Eg=1.5567 [eV]) | GaAs (Eg=1.42 [eV]) |
| ACTIVE LAYER — BARRIER LAYER | $Al_{0.3}Ga_{0.7}As$ (Eg= 1.78552 [eV]) | $Ga_xIn_{1-x}P$ (TENSILE STRAIN) (Eg(x=0.6)=2.02 [eV]) | $Al_{0.3}Ga_{0.7}As$ (Eg= 1.78552 [eV]) |
| Eg DIFFERENCE BETWEEN SPACER LAYER AND QUANTUM WELL LAYER [ΔEg] | 465.9 [meV] | 767.3 [meV] | 602.6 [meV] |
| Eg DIFFERENCE BETWEEN BARRIER LAYER AND QUANTUM WELL LAYER [ΔEg] | 228.8 [meV] | 463.3 [meV] | 365.5 [meV] |

FIG.18

| OPTICAL ELEMENT | LIGHT UTILIZATION EFFICIENCY | |
|---|---|---|
| | DEFLECTING DIRECTION: MAIN SCANNING DIRECTION | DEFLECTING DIRECTION: SUB-SCANNING DIRECTION |
| POLYGON MIRROR | 0.87 | 0.87 |
| SOUNDPROOF GLASS | 0.99 | 0.97 |
| FOLDED MIRROR (TWO-LAYER COATING: INCIDENCE ANGLE OF SUB-SCANNING CROSS SECTION=60°) | 0.98 | 0.78 |
| FOLDED MIRROR (FOUR-LAYER COATING: INCIDENCE ANGLE OF SUB-SCANNING CROSS SECTION=60°) | 0.99 | 0.87 |
| DUSTPROOF GLASS (WITHOUT COATING) | 0.97 | 0.95 |

FIG.19

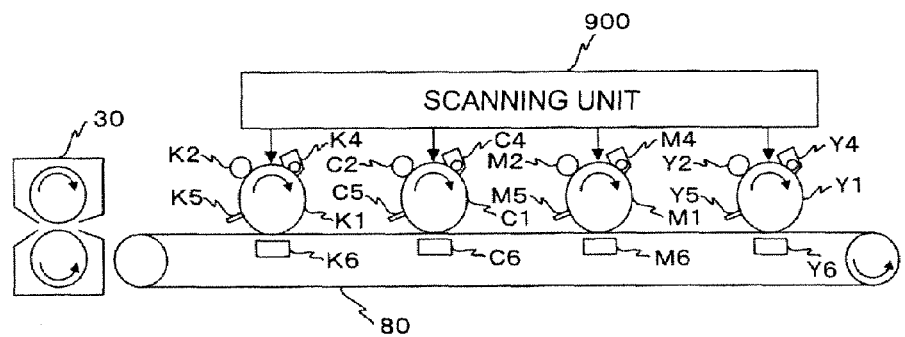

SCANNING UNIT AND IMAGE FORMING APPARATUS

CROSS-REFERENCE TO RELATED APPLICATIONS

The present application claims priority to and incorporates by reference the entire contents of Japanese priority document, 2006-290030 filed in Japan on Oct. 25, 2006.

BACKGROUND OF THE INVENTION

1. Field of the Invention

The present invention generally relates to a scanning unit, and specifically relates to an optical scanning unit for use in an image forming apparatus.

2. Description of the Related Art

Image forming apparatuses that employ laser are being widely used for printing electronic images. Such an image forming apparatus typically includes a scanning unit and a photosensitive drum. The scanning unit includes a polygon scanner (e.g., a polygon mirror) that deflects laser toward the photosensitive drum, which is rotating, thereby scanning the surface of the photosensitive drum with the laser. Due to such scanning, a latent image is formed on the surface of the photosensitive drum. In image forming apparatuses, image density must be increased to have better image quality, and images must be output speedily to have better operability.

One approach to increase the image density and output speed is to rotate the polygon scanner speedily. However, if the polygon scanner is rotated a high speed, noise and power consumption increases and durability of the polygon scanner drops.

Another approach is to produce multiple beams from a light flux emitted from the light source. As disclosed in Japanese Patent Application Laid-open No. 2005-250319 and Japanese Patent Application Laid-open No. 2004-287292 following three schemes are available for realizing the multiple beams:

(1) combining a plurality of facet emitting lasers,
(2) using a one-dimensional array of the facet emitting lasers, and
(3) a scheme of using a two-dimensional array of vertical cavity surface emitting lasers (VCSELs).

In the scheme (1), a low price can be realized because general-purpose lasers can be used, but using a plurality of beams to stably maintain a relative positional relationship between the lasers and a coupling lens is difficult, and an interval between a plurality of scan lines formed on a scanning target surface (hereinafter, "scan line interval") may possibly become uneven. Further, in the scheme (1), the number of light sources practically has a limit, and the density growth and the increase in speed also have limits. In the scheme (2), an even scan line interval can be formed, but this scheme has a disadvantage that a power consumption of an element is increased. Furthermore, when the number of light sources is extremely increased, a displacement amount of each beam from an optical axis of an optical system is increased, and a so-called beam quality may be degraded.

On the other hand, in the scheme (3), a power consumption is one digit smaller than that of the facet emitting laser, and more light sources can be two-dimensionally integrated.

Japanese Patent Application Laid-open No. 2005-250319 discloses a light source apparatus constituted by combining a plurality of pairs of a light source in which a plurality of light emitting points that can be independently modulated are two-dimensionally arranged and a coupling lens that couples divergent light fluxes emitted from the light source, a scanning unit having the light source mounted thereon, and an image forming apparatus having the scanning unit mounted thereon.

Japanese Patent Application Laid-open No. 2004-287292 discloses a scanning unit using a surface emitting laser array, and an image forming apparatus having the scanning unit mounted thereon.

Meanwhile, at the present day, because a light emitting power of the VCSEL is relatively small, reducing a loss of a light amount is important in the scheme (3).

SUMMARY OF THE INVENTION

It is an object of the present invention to at least partially solve the problems in the conventional technology.

According to an aspect of the present invention, there is provided a scanning unit that scans a scanning target surface by using light fluxes. The scanning unit includes a light source having a plurality of surface emitting lasers; a deflector that deflects light fluxes output by the light source; and an optical system that is arranged in an optical path between the light source and the deflector, and includes a first optical system that leads the light fluxes output by the light source to the deflector and a second optical system that leads the light fluxes deflected by the deflector to the scanning target surface. An absolute value of a lateral magnification in a main scanning direction is larger than an absolute value of a lateral magnification in a sub-scanning direction in the optical system. Moreover, a beam diameter in the sub-scanning direction on the scanning target surface is equal to or smaller than a beam diameter in the main scanning direction on the same and larger than a scan line interval.

According to another aspect of the present invention, there is provided a scanning unit that scans a scanning target surface by using light fluxes. The scanning unit includes a light source having a plurality of surface emitting lasers each emitting a linearly polarized light flux; a deflector that defects the light fluxes output by the light source; and an optical system that is arranged in an optical path between the light source and the deflector, and includes a first optical system that leads the light fluxes output by the light source to the deflector and a second optical system that leads the light fluxes deflected by the deflector to the scanning target surface. An absolute value of a lateral magnification in a main scanning direction is larger than an absolute value of a lateral magnification in a sub-scanning direction in the optical system. Moreover, an angle between a polarizing direction for the linear polarized light and the main scanning direction is larger than an angle between the polarizing direction of the linear polarized light and the sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a table for explaining the relation between image height and beam diameter for the aperture plate depicted in FIG. 8 depicted in FIG. 10 is used;

FIG. 12A and FIG. 12B are views for explaining light flux emitted from the VCSEL;

FIG. 15 is a partially enlarged view of the VCSEL depicted in FIG. 14;

FIG. 16 is a table for explaining characteristics of the VCSEL depicted in FIG. 14;

FIG. 18 is a table for explaining a relationship between a polarizing direction and a light utilization efficiency; and FIG. 19 is a view for explaining a structure of a typical tandem color image forming apparatus.

DETAILED DESCRIPTION OF THE PREFERRED EMBODIMENTS

Exemplary embodiments of the present invention will now be explained hereinafter with reference to accompanying drawings.

Figure 1:
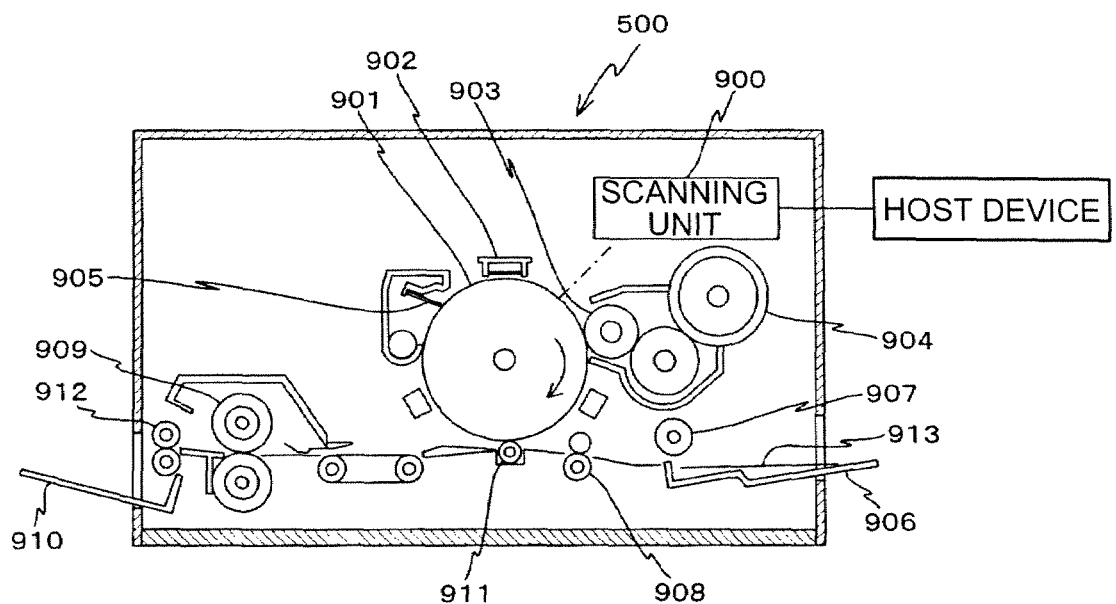
FIG. 1 is a schematic view of a laser printer according to an embodiment of the present invention.

FIG. 1 depicts a laser printer 500 according to an embodiment of the present invention. The laser printer 500 includes a scanning unit 900, a photosensitive drum 901, an electrostatic charger 902, a developing roller 903, a toner cartridge 904, a cleaning blade 905, a paper feed tray 906, a paper feed runner 907, a pair of registration rollers 908, a transfer charger 911, a fixing roller 909, a pair of paper ejection rollers 912, a paper ejection tray 910.

The electrostatic charger 902, the developing roller 903, the transfer charger 911, and the cleaning blade 905 are arranged around and near the periphery of the photosensitive drum 901. The electrostatic charger 902, the developing roller 903, the transfer charger 911, and the cleaning blade 905 are arranged in this order along the direction of rotation (direction indicted by an arrow in FIG. 1) of the photosensitive drum 901.

The photosensitive drum 901 has a photosensitive layer on its surface. That is, the surface of the photosensitive drum 901 is a scan target surface.

The electrostatic charger 902 uniformly electrostatically charges the surface, i.e., the photosensitive layer, of the photosensitive drum 901.

The scanning unit 900 irradiates the surface of the photosensitive drum 901, which has been charged by the electrostatic charger 902, with light modulated based on image information received from a host device (e.g., a personal computer). As a result, electric charges on the surface of the photosensitive drum 901 are lost in a part that is irradiated with the light thereby forming a latent image corresponding to the image information on the surface of the photosensitive drum 901. The latent image rotates as the photosensitive drum 901 rotates and thus moves below the developing roller 903.

The longitudinal direction of the photosensitive drum 901, i.e., the direction of the axis of rotation of the photosensitive drum 901 is the main scanning direction. On the other hand, the direction perpendicular to the main scanning direction, i.e., the direction of rotation of the photosensitive drum 901 is the sub-scanning direction.

The toner cartridge 904 contains toner, and the toner is supplied to the developing roller 903. Amount of toner in the toner cartridge 904 is checked each time the power supply is turned ON or printing is finished. If the toner cartridge 904 contains less toner, a message that urges replacement of the toner cartridge 904 is displayed on a display device (not shown).

The toner in the toner cartridge 904 is electrostatically charged so that the toner adheres to the surface of the developing roller 903. As the developing roller 903 rotates, a thin and uniform layer of the toner is formed on the entire surface of the developing roller 903. A voltage of opposite polarity with respect to the non-charged part (part that is irradiated with the light) on the photosensitive drum 901 is applied to the developing roller 903. Due to the voltage difference between the photosensitive drum 901 and the developing roller 903, the toner on the surface of the developing roller 903 adheres only to the non-charged part on the surface of the photosensitive drum 901. That is, the latent image on the surface of the photosensitive drum 901 is developed into a toner image (visible image or manifest image). As the photosensitive drum 901 rotates, the toner image moves below the transfer charger 911.

Recording paper sheets 913 are stacked in the paper feed tray 906. The paper feed runner 907 is arranged near the paper feed tray 906, and the paper feed runner 907 takes out the recording paper sheets 913 one by one from the paper feed tray 906 and carries them into a nip between the pair of the registration rollers 908. The registration rollers 908 are arranged near the transfer charger 911. The registration rollers 908 temporarily hold the recording paper sheet 913 by sandwiching the recording paper sheet 913 and supplies the recording paper sheet 913 into a nip between the photosensitive drum 901 and the transfer charger 911.

A voltage having a polarity opposite to that of the toner is applied to the transfer charger 911. Due to the voltage difference between the toner and the transfer charger 911, the toner on the surface of the photosensitive drum 901 gets attracted toward the transfer charger 911, i.e., the recording paper sheet 913. In other words, the toner image on the surface of the photosensitive drum 901 is transferred onto the recording paper sheet 913. The recording paper sheet 913 with the toner image is supplied to the fixing roller 909.

The fixing roller 909 applies heat and pressure to the recording paper sheet 913 with the toner image. As a result, the toner image gets fixed to the recording paper sheet 913. The recording paper sheet 913 with the fixed toner image is then passed into a nip between the paper ejection rollers 912. The paper ejection rollers 912 discharge the recording paper sheet 913 with the fixed toner image into the paper ejection tray 910.

The cleaning blade 905 removes the toner remaining on the surface of the photosensitive drum 901 (residual toner) thereby cleaning the surface of the photosensitive drum 901. The removed residual toner is reutilized or recycled. The cleaned the photosensitive drum 901 is ready for subsequent charging by the electrostatic charger 902.

Figure 2:
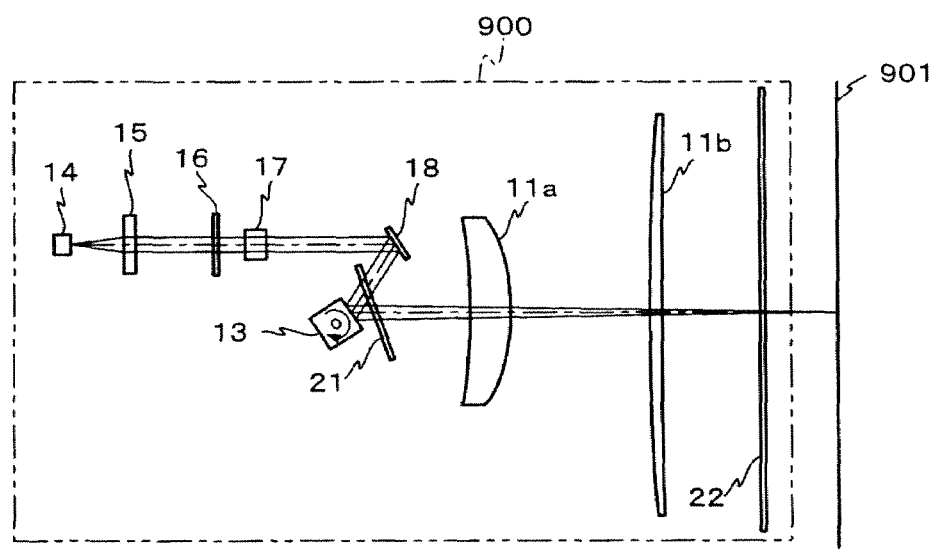
FIG. 2 is a detailed schematic view of a scanning unit depicted in FIG. 1.

A structure of the scanning unit 900 will now be explained with reference to FIGS. 2 to 12B. The scanning unit 900 includes a light source 14, a coupling lens 15, an aperture plate 16, an anamorphic lens 17, a reflecting mirror 18, a polygon mirror 13, a motor (not shown) that rotates the polygon mirror 13, and two scanning lens (11a, 11b). The left-right direction in the plane of the page of FIG. 2 is the main scanning direction, and the top-bottom direction in the plane of the page of FIG. 2 is the sub-scanning direction.

Figure 3:
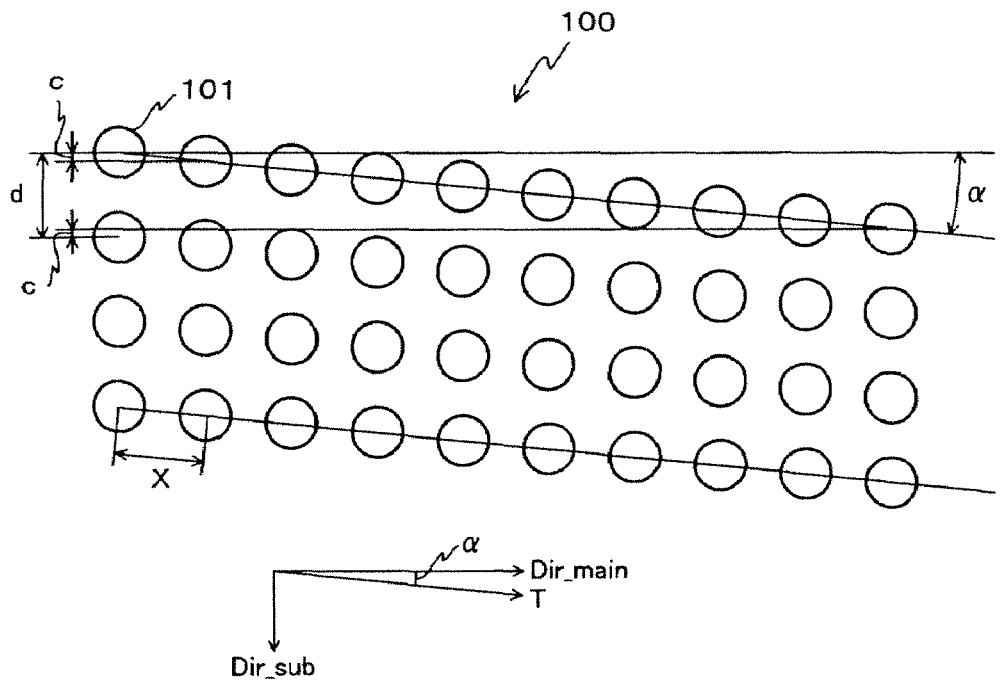
FIG. 3 is a schematic of a two-dimensional array of VCSELs included in a light source depicted in FIG. 2.

As shown in FIG. 3, the light source 14 includes a two-dimensional array 100 of for example 40 light emitters 101. The light emitters are arranged in 4 rows each having 10 light emitters arranged at equal interval X in the main scanning direction. Moreover, each row extends in a direction T that makes a tilt angle α with respect to the main scanning direction ("Dir_main") toward the sub-scanning direction ("Dir_sub"). The rows are parallel to each other and they are arranged at equal interval d in the direction Dir_sub. These rows will be called a first light emitter row, a second light emitter row, a third light emitter row, and a fourth light emitter row from an upper side toward a lower side of a page of FIG. 3 for the convenience's sake.

For example, the row interval d is 44.0 micrometers and the emitter interval X is 30.0 micrometers. Moreover, and a subsequent emitter interval c, which is a distance between the center of the first light emitter in a given row (say, second light emitter row) and the last light emitter in a previous row (first light emitter row) is 4.4 micrometers. It is to be noted that the "light emitter interval" means a distance between centers of the two light emitters in this specification.

Figure 4:
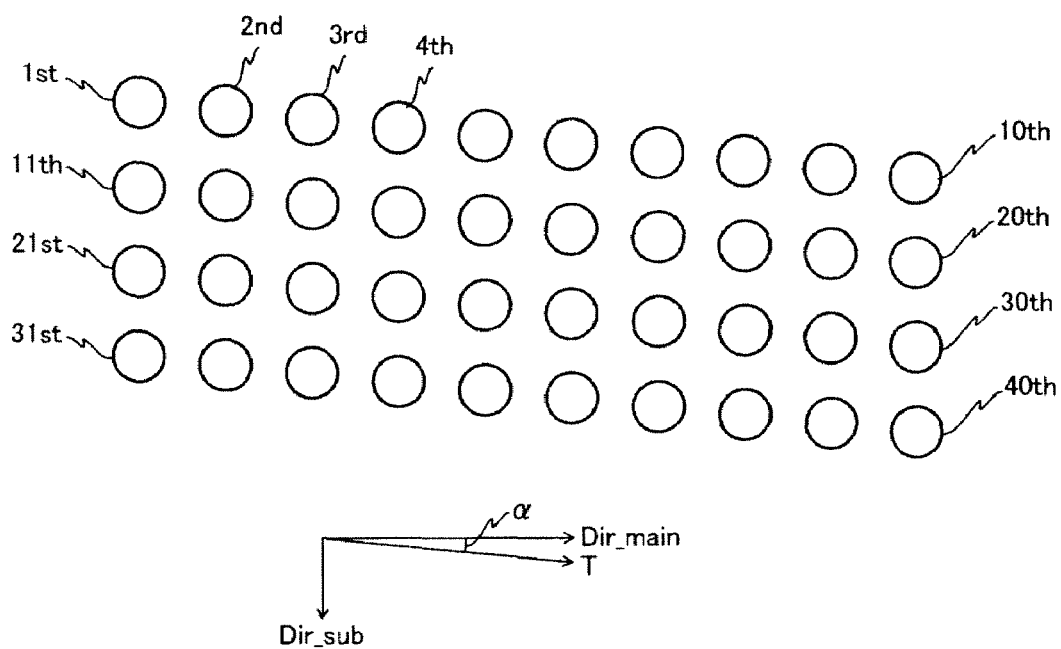
FIG. 4 is a schematic for explaining the numbering of light emitters depicted in FIG. 3.

For the convenience's sake, the light emitters are numbered in the manner shown in FIG. 4. The light emitters of the first light emitter row are numbered 1st to 10th, the light emitters of the second light emitter row are numbered 11th to 20th, the light emitters of the third light emitter row are numbered 21st to 30th, and the light emitters of the fourth light emitter row are numbered 31st to 40th.

Figure 5:
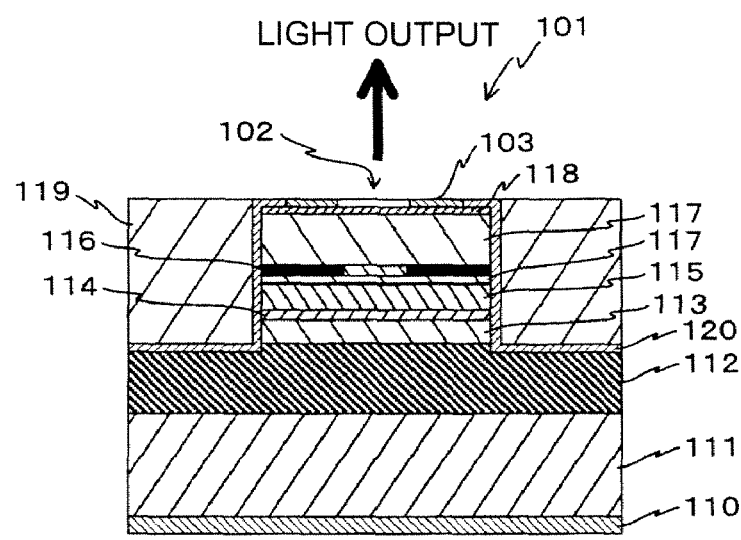
FIG. 5 is a cross-section of the VCSEL depicted in FIG. 3.
Figure 6:
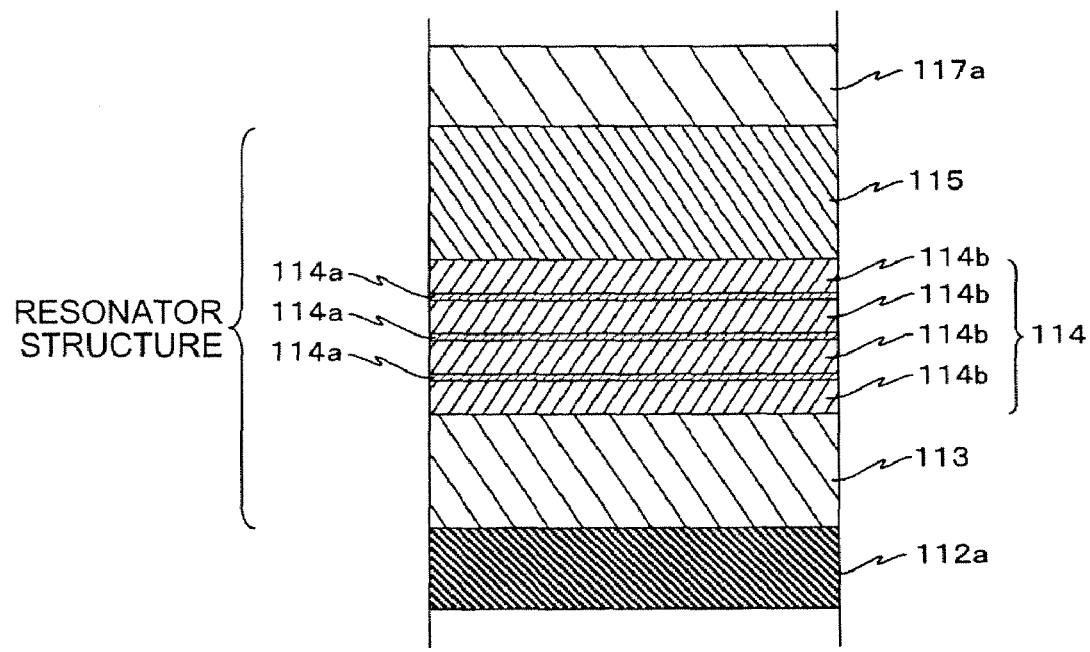
FIG. 6 is a partially enlarged view of the VCSEL depicted in FIG. 5.

Each light emitter is a 780-nm vertical cavity surface emitting laser (VCSEL). For example, as shown in FIG. 5, in each light emitter, semiconductor layers, e.g., a lower reflecting mirror 112, a spacer layer 113, an active layer 114, a spacer layer 115, an upper reflecting mirror 117, and a p-contact layer 118 are sequentially laminated on an n-GaAs substrate 111. The structure shown in FIG. 5 that is obtained by laminating the semiconductor layers will be also called a "laminated body" for the convenience's sake. FIG. 6 is an enlarged view of a part near the active layer 114.

The lower reflecting mirror 112 has 40.5 pairs of a low-refraction-index layer made of n-$Al_{0.9}Ga_{0.1}As$ (low-refraction-index layer 112a) and a high-refraction-index layer made of n-$Al_{0.3}Ga_{0.7}As$ (high-refraction-index layer 112b). Each of these layers has an optical thickness of λ/4, where λ is an oscillation wavelength. A composition gradient layer (not shown), which is a layer whose composition is gradually changed from one composition to other composition, is provided between the low-refraction-index layer 112a and the high-refraction-index layer 112b. Provision of the composition gradient layer reduces the electrical resistance.

The spacer layer 113 is formed of $Al_{0.6}Ga_{0.4}As$.

As shown in FIG. 6, the active layer 114 includes a quantum well layer 114a formed of $Al_{0.12}Ga_{0.88}As$ and a barrier layer 114b formed of $Al_{0.3}Ga_{0.7}As$.

The spacer layer 115 is formed of $Al_{0.6}Ga_{0.4}As$.

The spacer layer 113, the active layer 114, and the spacer layer 115 are also collectively called a resonator structure (see FIG. 6). The resonator structure has an optical thickness of one wavelength.

The upper reflecting mirror 117 has 24 pairs of a low-refraction-index layer made of p-$Al_{0.9}Ga_{0.1}As$ (low-refraction-index layer 117a) and a high-refraction-index layer made of p-$Al_{0.3}Ga_{0.7}As$ (high-refraction-index layer 117b). Each of these layers has an optical thickness of λ/4. A composition gradient layer (not shown), which is a layer whose composition is gradually changed from one composition to other composition, is provided between the low-refraction-index layer 117a and the high-refraction-index layer 117b. Provision of the composition gradient layer reduces the electrical resistance.

A selective oxide layer 116 made of AlAs is provided at a position that is λ/4 away from the resonator structure in the upper reflecting mirror 117.

A method of manufacturing the two-dimensional array 100 will now be briefly explained.

(1) The laminated body is created based on crystal growth using a metal-organic chemical vapor deposition method (MOCVD method) or a molecular beam crystal growth method (MBE method).

(2) A groove is formed in each periphery of a plurality of regions respectively serving as the light emitters based on a dry etching method to form a so-called mesa portion. An etching bottom surface extends inside of the lower reflecting mirror 112. It is sufficient that the etching bottom surface extends at a position beyond at least the selective oxide layer 116. As a result, the selective oxide layer 116 appears on a sidewall of the groove. The diameter of the mesa portion is preferably 10 micrometers or above. If the mesa portion is too small, heat is stored therein at the time of an element operation, and light emitting characteristics may be adversely affected. The width of the groove is preferably 5 micrometers or above. If the groove is too narrow, controlling etching becomes difficult.

(3) The laminated body having each groove formed therein is subjected to a heat treatment in water vapor, a part of the selective oxide layer 116 in the mesa portion is selectively oxidized to be changed into an insulator layer made of $Al_xO_y$. At this time, an AlAs region that is not oxidized in the selective oxide layer 116 remains at the central part of the mesa portion. As a result, a so-called current constricting structure that limits a path of a driving current for the light emitters to the central part of the mesa portion alone is formed.

(4) An $SiO_2$ protection layer 120 having a thickness of, e.g., 150 nanometers is provided except a region of each mesa portion where an upper electrode 103 is formed and a light emitter 102, and each groove is filled with polyimide 119 and then flattened.

(5) The upper electrode 103 is formed in a region except the light emitter 102 on the p-contact layer 118 in each mesa portion, and each bonding pad (not depicted) is formed around the laminated body. Each wiring line (not depicted) that connects each upper electrode 103 with a corresponding bonding pad is formed.

(6) A lower electrode (n-side common electrode) 110 is formed on a rear surface of the laminated body.

(7) The laminated body is cut into a plurality of chips.

Figure 7:
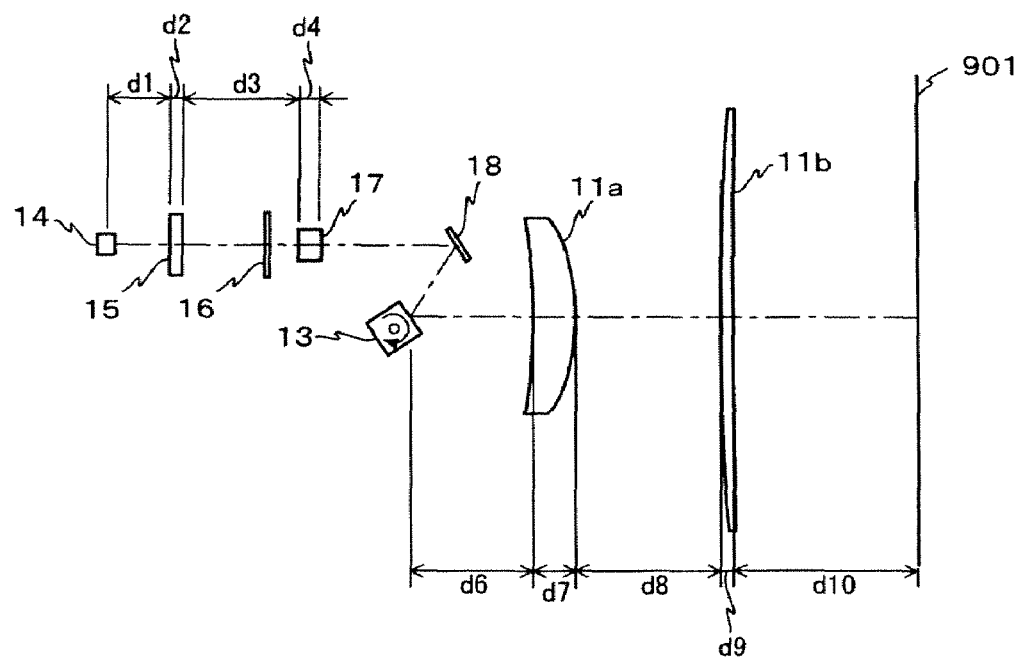
FIG. 7 is a schematic for explaining the arrangement of optical elements in the scanning unit depicted in FIG. 2.

FIG. 7 depicts a positional relationship between the respective optical elements in the scanning unit 900.

The coupling lens 15 is arranged in an optical path of a light flux emitted from the light source 14, and converts the light flux emitted from the light source 14 into a substantially parallel light. The coupling lens 15 is arranged at a position where an optical path length (reference character d1 in FIG. 7) from the light source 14 is 39.305 millimeters, for example. A thickness (reference character d2 in FIG. 7) of the coupling lens 15 is, e.g., 3.8 millimeters. A focal distance of the coupling lens 15 is 42.0 millimeters.

Both surfaces of the coupling lens 15 have a non-arc shape represented by Equation (1). In Equation (1), x is a depth in an optical axis direction, h is a distance from the optical axis, R is a paraxial curvature radius, K is a cone constant, and each of $A_4, A_6, A_8, A_{10}, \ldots$ is a coefficient.

$$x = \frac{\frac{h^2}{R}}{1 + \sqrt{1 - (1+K) \cdot \left(\frac{h}{R}\right)^2}} + A_4 \cdot h^4 + A_6 \cdot h^6 + A_8 \cdot h^8 + A_{10} \cdot h^{10} \quad (1)$$

For example, $R=\infty$ is achieved on a first surface whilst $R=-21.519$ millimeters is attained on a second surface of the coupling lens 15. It is to be noted that the paraxial curvature radius R, the cone constant K, and the coefficients $A_4, A_6, A_8, A_{10} \ldots$ are set to excellently compensate a wavefront aberration.

It is to be noted that the light source 14 and the coupling lens 15 are held by a holding member made of aluminum. A cover glass having a refraction index of 1.5112 and a thickness of 0.3 millimeters is arranged between the light source 14 and the coupling lens 15.

The aperture plate 16 is arranged in an optical path between the coupling lens 15 and the anamorphic lens 17, and defines a beam diameter of a light flux traveling through the coupling lens 15. For example, the aperture plate 16 is arranged at a position having an optical path length of 13.8 millimeters from the second surface of the coupling lens 15. This position is a position close to the light source 14 apart from a rear focal position of the coupling lens 15.

Figure 8:
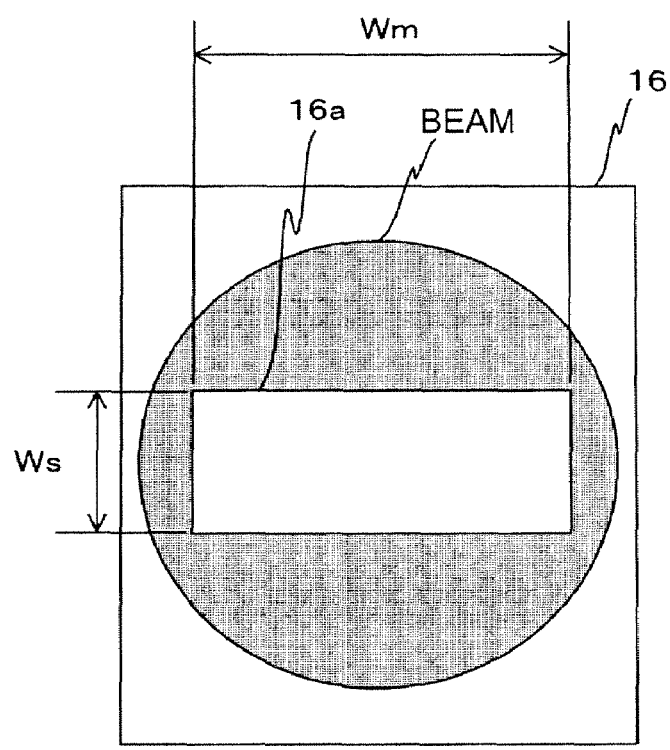
FIG. 8 is a view for explaining an opening in an aperture plate depicted in FIG. 2.

For example, as shown in FIG. 8, the opening 16a of the aperture plate 16 has a width Wm in the main scanning direction that is 5.6 mm and a width Ws in the sub-scanning direction that is 1.3 mm.

The anamorphic lens 17 is arranged in an optical path between the aperture plate 16 and the reflecting mirror 18, and forms an image of a light flux transmitted through the opening in the aperture plate 16 near a deflecting/reflecting surface of the polygon mirror 13 via the reflecting mirror 18 in relation to the sub-scanning direction. Here, for example, the anamorphic lens 17 is arranged at a position having an optical path length (reference character d3 in FIG. 7) of 79.3 millimeters from the second surface of the coupling lens 15. A thickness (reference character d4 in FIG. 7) of the anamorphic lens 17 is, e.g., 3.0 millimeters.

A first surface of the anamorphic lens 17 is a cylindrical surface having a power in the sub-scanning direction, and its curvature radius in the sub-scanning direction is 26.9 millimeters. A second surface of the anamorphic lens 17 is a flat surface.

A soundproof glass 21 having a wall thickness of 1.9 millimeters and a refraction index of 1.5112 is arranged between the anamorphic lens 17 and the polygon mirror 13 and between the polygon mirror 13 and a scanning lens 11a (see FIG. 2).

It is to be noted that an optical system arranged in an optical path between the light source 14 and the polygon mirror 13 is also called a coupling optical system. In one embodiment, the coupling optical system includes the coupling lens 15, the aperture plate 16, the anamorphic lens 17, and the reflecting mirror 18.

The polygon mirror 13 is, e.g., a four-sided mirror having a radius of an inscribed circle being 7 millimeters, and each mirror functions as a deflecting/reflecting surface. This polygon mirror 13 rotates at a constant speed around a rotary shaft parallel to the sub-scanning direction. Here, the polygon mirror 13 is arranged at, e.g., a position having an optical path length of 51.8 millimeters from the second surface of the anamorphic lens 17 to the rotary shaft.

The scanning lens 11a is arranged in the optical path of a light flux deflected by the polygon mirror 13. Here, the scanning lens 11a is arranged at, e.g., a position having an optical path length (reference character d6 in FIG. 7) of 46.3 millimeters from the rotary shaft of the polygon mirror 13 to the first surface of the scanning lens 11a.

For example, as shown in Table 1, the scanning lens 11a has a first surface (incidence-side surface) having a paraxial curvature radius of −120 millimeters in the main scanning direction and a paraxial curvature radius of −500 millimeters in the sub-scanning direction, and a second surface (exit-side surface) having a paraxial curvature radius of −59.28 millimeters in the main scanning direction and a paraxial curvature radius of −600 millimeters in the sub-scanning direction. A wall thickness (reference character d7 in FIG. 7) of the scanning lens 11a at the center (on the optical axis) is 13.5 millimeters.

TABLE 1

|  | First surface | Second surface |
|---|---|---|
| Paraxial curvature radius in main scanning direction (mm) | −120 | −59.28 |
| Paraxial curvature radius in sub-scanning direction (mm) | −500 | −600 |

The scanning lens 11b is arranged in the optical path of a light flux traveling through the scanning lens 11a. Here, the scanning lens 11b is arranged at, e.g., a position having an optical path length (reference character d8 in FIG. 7) of 89.7 millimeters from the second surface of the scanning lens 11a to a first surface of the scanning lens 11b. As shown in Table 2, the scanning lens 11b has a first surface (incidence-side surface) having a paraxial curvature radius of ∞ in the main scanning direction and a paraxial curvature radius of 522 millimeters in the sub-scanning direction, and a second surface (exit-side surface) having a paraxial curvature radius of 540.6 millimeters in the main scanning direction and a paraxial curvature radius of −40.75 millimeters in the sub-scanning direction. A wall thickness (reference character d9 in FIG. 7) of the scanning lens 11b at the center (on the optical axis) is 3.5 millimeters.

TABLE 2

|  | First surface | Second surface |
|---|---|---|
| Paraxial curvature radius in main scanning direction (mm) | ∞ | 540.6 |
| Paraxial curvature radius in sub-scanning direction (mm) | 522 | −40.75 |

Each surface of the scanning lens 11a and the scanning lens 11b has an aspherical surface, and all the surfaces have a non-arc shape represented by Equation (1) in the main scanning direction. A curvature within a virtual cross section (hereinafter, "sub-scan cross section") parallel to both the optical axis direction and the sub-scanning direction is a surface (special surface) that varies in the main scanning direction based on Equation (2). In Equation (2), Y is a distance from the optical axis in the main scanning direction, $R_S$ is a paraxial curvature radius in the sub-scanning direction, and each of $B_1, B_2, B_3, \ldots$ is a coefficient.

$$Cs(Y) = \frac{1}{R_S} + B_1 \cdot Y + B_2 \cdot Y^2 + B_3 \cdot Y^3 + B_4 \cdot Y^4 + B_5 \cdot Y^5 + B_6 \cdot Y^6 \quad (2)$$

Table 3 depicts a cone constant and each coefficient of the first surface of the scanning lens 11a. Table 4 depicts a cone constant and each coefficient of the second surface of the scanning lens 11a. Table 5 depicts a cone constant and each coefficient of the first surface of the scanning lens 11b. Table 5 depicts a cone constant and each coefficient of the first surface of the scanning lens 11b. Table 6 depicts a cone constant and a coefficient of the second surface of the scanning lens 11b.

TABLE 3

| K | 0 | $B_1$ | 0 |
|---|---|---|---|
| $A_4$ | $8.885 \times 10^{-7}$ | $B_2$ | 0 |
| $A_6$ | $-2.629 \times 10^{-10}$ | $B_3$ | 0 |
| $A_8$ | $2.1846 \times 10^{-14}$ | $B_4$ | 0 |
| $A_{10}$ | $1.368 \times 10^{-17}$ | $B_5$ | 0 |
| $A_{12}$ | $-3.135 \times 10^{-21}$ | $B_6$ | 0 |
| | | $B_7$ | 0 |
| | | $B_8$ | 0 |

TABLE 4

| K | 0 | $B_1$ | $-1.594 \times 10^{-6}$ |
|---|---|---|---|
| $A_4$ | $9.2240 \times 10^{-7}$ | $B_2$ | $-4.332 \times 10^{-6}$ |
| $A_6$ | $6.7782 \times 10^{-11}$ | $B_3$ | $4.9819 \times 10^{-9}$ |
| $A_8$ | $-4.1124 \times 10^{-14}$ | $B_4$ | $-2.8594 \times 10^{-9}$ |
| $A_{10}$ | $1.3727 \times 10^{-17}$ | $B_5$ | $-2.677 \times 10^{-12}$ |
| $A_{12}$ | $2.069 \times 10^{-21}$ | $B_6$ | $2.8778 \times 10^{-13}$ |
| | | $B_7$ | $-1.916 \times 10^{-15}$ |
| | | $B_8$ | $2.0423 \times 10^{-15}$ |
| | | $B_9$ | $1.0141 \times 10^{-18}$ |
| | | $B_{10}$ | $-6.729 \times 10^{-19}$ |

TABLE 5

| K | 0 | $B_1$ | 0 |
|---|---|---|---|
| $A_4$ | $3.286 \times 10^{-7}$ | $B_2$ | $-1.1328 \times 10^{-6}$ |
| $A_6$ | $-7.085 \times 10^{-11}$ | $B_3$ | $2.60612 \times 10^{-10}$ |
| $A_8$ | $6.269 \times 10^{-15}$ | $B_4$ | $7.8961 \times 10^{-11}$ |
| $A_{10}$ | $-2.7316 \times 10^{-19}$ | $B_5$ | $-5.027 \times 10^{-14}$ |
| $A_{12}$ | $4.739 \times 10^{-24}$ | $B_6$ | $1.4051 \times 10^{-14}$ |
| | | $B_7$ | $4.5538 \times 10^{-18}$ |
| | | $B_8$ | $-2.0140 \times 10^{-18}$ |
| | | $B_9$ | $-1.546 \times 10^{-22}$ |
| | | $B_{10}$ | $7.4893 \times 10^{-23}$ |

TABLE 6

| K | 0 | $B_1$ | 0 |
|---|---|---|---|
| $A_4$ | $1.2779 \times 10^{-7}$ | $B_2$ | $2.311 \times 10^{-7}$ |
| $A_6$ | $-4.629 \times 10^{-11}$ | $B_3$ | 0 |
| $A_8$ | $4.049 \times 10^{-15}$ | $B_4$ | 0 |
| $A_{10}$ | $-1.659 \times 10^{-19}$ | $B_5$ | 0 |
| $A_{12}$ | $2.585 \times 10^{-24}$ | $B_6$ | 0 |
| | | $B_7$ | 0 |
| | | $B_8$ | 0 |

The optical system arranged in the optical path between the polygon mirror 13 and the photosensitive drum 901 is also called a scanning optical system. In this embodiment, the scanning optical system includes the scanning lens 11a and the scanning lens 11b.

The scanning unit 900 is arranged in such a manner that an optical path length (reference character d10 in FIG. 7) from the second surface of the scanning lens 11b to the photosensitive drum 901 becomes 142.5 millimeters, for example. It is to be noted that a dustproof glass 22 having a refraction index of 1.5112 and a wall thickness of 1.9 millimeters is arranged between the scanning lens 11b and the photosensitive drum 901.

A length of an effective scanning region (writing width in the main scanning direction) in the photosensitive drum 901 is 323 millimeters.

The optical system including the coupling optical system and the scanning optical system has a lateral magnification of 5.7 in the main scanning direction and a lateral magnification of 1.2 in the sub-scanning direction. That is, an absolute value of the lateral magnification in the main scanning direction is larger than an absolute value of the lateral magnification in the sub-scanning direction. As a result, a scan line interval between is narrowed, and a resolution can be increased. In this embodiment, the scan line interval is 5.3 micrometers, and a writing density of 4800 dots per inch can be realized.

Figures 9, 10:
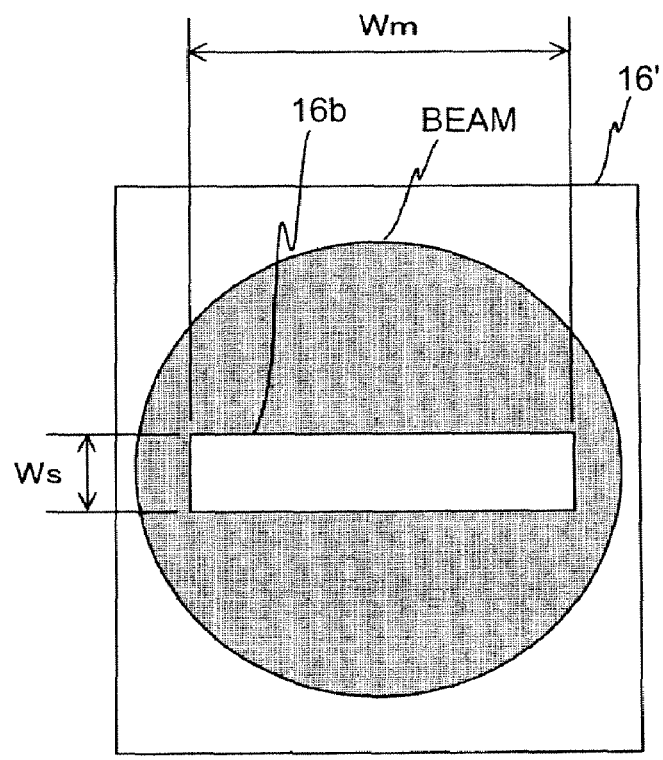
FIG. 9 is a table for explaining the relation between image height and beam diameter for the aperture plate depicted in FIG. 8.
FIG. 10 is a view for explaining an opening in an aperture plate in a conventional scanning unit.
Figure 13:
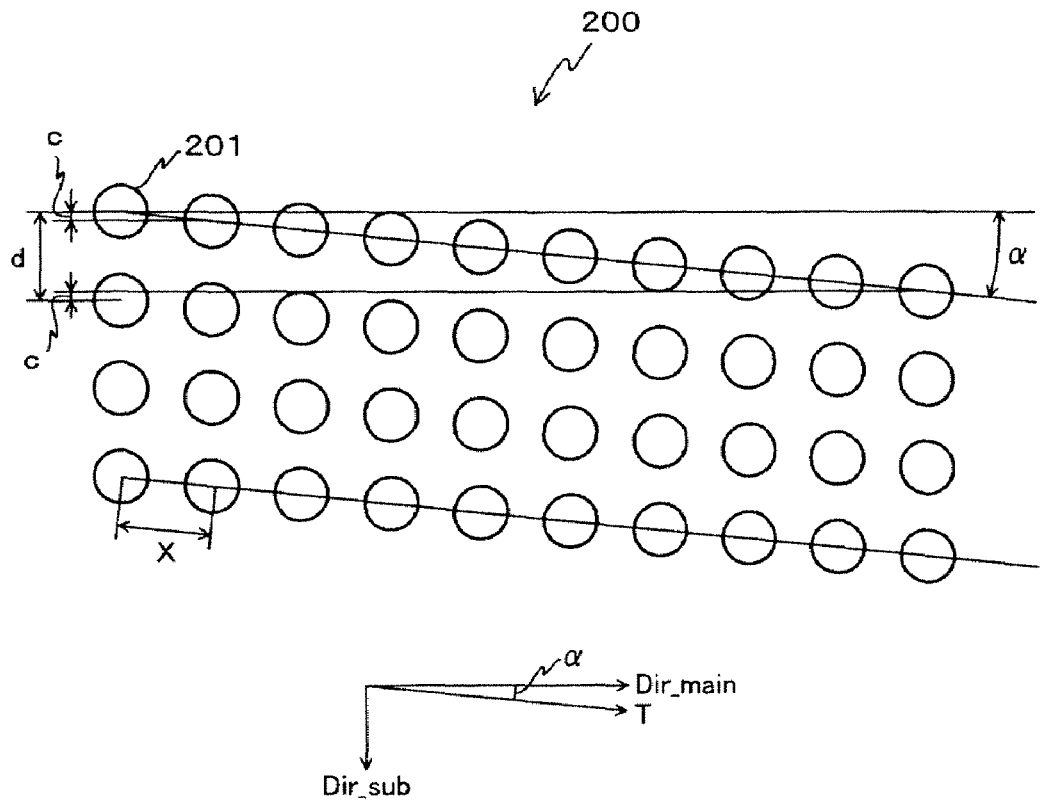
FIG. 13 is a view for explaining a modification of the two-dimensional array of the VCSELs.
Figure 14:
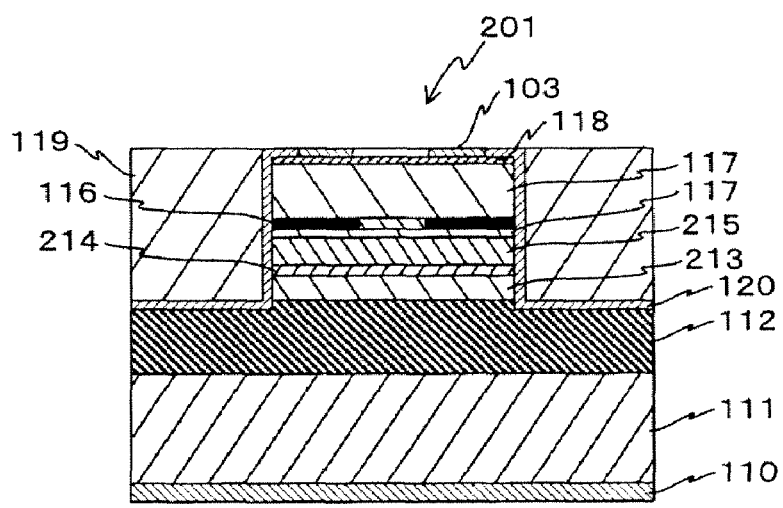
FIG. 14 is a cross-section of the VCSEL depicted in FIG. 13.

FIG. 9 depicts a beam diameter in the main scanning direction and a beam diameter in the sub-scanning direction on the surface of the photosensitive drum 901 obtained by the thus configured scanning unit 900. As shown in FIG. 9, the beam diameter in the sub-scanning direction is equal to or below the beam diameter in the main scanning direction. It is to be noted that a diameter defined based on a maximum intensity $1/e^2$ is determined as the beam diameter in this specification.

It is to be noted that FIG. 11 depicts a beam diameter in the main scanning direction and a beam diameter in the sub-scanning direction on the surface of the photosensitive drum 901 when a conventional aperture plate 16' including an opening 16b having a width Wm of 5.6 millimeters in the main scanning direction, and a width Ws of 0.8 millimeters in the sub-scanning direction is used in place of the aperture plate 16 as shown in FIG. 10. As shown in FIG. 11, the beam diameter in the main scanning direction is set to be smaller than the beam diameter in the sub-scanning direction on a scanning target surface in the conventional example.

As apparent from FIGS. 9 and 11, in the scanning unit 900, the beam diameter in the sub-scanning direction is reduced as compared with that in the conventional example, roughness of an image is reduced to improve a granularity degree, and an image can be output with an excellent resolution. In the scanning unit 900, because the width of the opening in the aperture plate 16 in the sub-scanning direction is approximately 1.6-fold of that in the conventional example, and hence a light utilization efficiency is improved approximately 60% as compared with the conventional example.

When the center of the two-dimensional array 100 and the center of the opening in the aperture plate 16 are positioned in regard to the direction vertical to the optical axis, a center of a light flux from the light emitter arranged at the outermost position on the periphery in the two-dimensional array in the light emitters in the two-dimensional array 100 does not match with the center of the aperture plate 16. Therefore, the light utilization efficiency of the light flux from the light emitter arranged at the outermost position on the periphery is smaller than that of a light flux from the light emitter arranged at the center in the two-dimensional array. Thus, in the light emitter arranged at the outermost position on the periphery, increasing a light emission amount beyond those of the other light emitters enables suppressing occurrence of density unevenness.

As explained above, the scanning unit 900 according to this embodiment includes the light source 14 having the surface emitting lasers, the polygon mirror 13 that deflects light fluxes from the light source 14, the coupling optical system that is arranged in the optical path between the light source 14 and the polygon mirror 13 to lead the light fluxes from the light source 14 to the polygon mirror 13, and the scanning optical system that leads the light fluxes deflected by the polygon mirror 13 to the photosensitive drum 901. An absolute value of a lateral magnification along the main scanning direction is larger than an absolute value of a lateral magnification along the sub-scanning direction in the optical system including the coupling optical system and the scanning optical system, and a beam diameter in the sub-scanning direction on the surface of the photosensitive drum 901 is set to be equal to or below a beam diameter in the main scanning direction on the same and also set to be larger than the scan line interval. As a result, in the optical system, a loss of a light amount can be reduced as compared with the conventional example, and beam shaping can be performed. Consequently, the light utilization efficiency can be improved.

Meanwhile, as shown in FIGS. 12A and 12B, since a light flux exiting from the VCSEL becomes a light flux whose cross-sectional shape vertical to the optical axis is close to a circular shape, a light amount becomes insufficient in the aperture plate which defines a beam diameter on the surface of the photosensitive drum when the width of the opening in the main scanning direction is greatly different from the width of the same in the sub-scanning direction, and hence the present invention cannot cope with an increase in speed.

In this embodiment, because the beam diameter in the main scanning direction is set to be larger than the beam diameter in the sub-scanning direction on the surface of the photosensitive drum 901, a difference between the width of the opening in the aperture plate 16 along the main scanning direction and the width of the same along the sub-scanning direction can be reduced as compared with the conventional example, thereby increasing a coupling efficiency (ratio of a power of a light exiting from the opening with respect to a power of a light exiting from each light emitter).

Because this embodiment uses the so-called multi-beam light source, a resolution ratio and a speed can be increased. In this case, because the scan line interval is reduced, the beam diameter in the sub-scanning direction can be set to be larger than the scan line interval. Therefore, a dense image can be provided without producing a gap in the sub-scanning direction.

As methods of using the multi-beam light source to increase a writing density in the sub-scanning direction, there are (1) a method of reducing the lateral magnification in the sub-scanning direction of the optical system including the coupling optical system and the scanning optical system, and (2) a method of reducing a light emitter interval in the sub-scanning direction. However, according to the method (1), in the aperture plate that defines the beam diameter on a scanning target surface, the width of the opening in the sub-scanning direction must be reduced, resulting in a light amount insufficiency. On the other hand, according to the method (2), a thermal interference between the light emitters has an influence, or assuring a space required to provide a wiring line from each light emitter becomes difficult.

This embodiment uses the two-dimensional array 100 having a structure where the four light emitters are arranged along the direction Dir_sub corresponding to the sub-scanning direction, the 10 light emitters are arranged along the direction T forming the tilt angle α from the direction Dir_main corresponding to the main scanning direction toward the direction Dir_sub, and intervals between the light emitters are equal when the light emitters are subjected to orthogonal production onto a virtual line extending in the direction Dir_sub. In this case, because the intervals between the light emitters in the main scanning direction that do not affect density growth in the sub-scanning direction are increased, each light emitter interval in the sub-scanning direction can be reduced while reducing the influence of the thermal interference between the light emitters or assuring the space required to provide the wiring line of each light emitter.

According to this embodiment, a focal distance of the coupling lens 15 is set to be larger than the optical path length between the coupling lens 15 and the aperture plate 16. As a result, the optical path length from the light source 14 to the photosensitive drum 901 can be reduced as compared with the conventional example. It is to be noted that the aperture plate that defines the beam diameter on a scanning target surface is generally arranged at a rear focal position of the coupling lens.

Because the laser printer 500 according to this embodiment includes the scanning unit 900 that can improve the light utilization efficiency, a high-quality image can be formed at a high speed.

It is to be noted that, in this embodiment, an aperture plate having an opening whose width in the main scanning direction alone is shorter than that in the conventional example may substitute for the aperture plate 16. However, in this case, the focal distance of the coupling lens 15 must be decreased according to a reduction in the width in the main scanning direction.

It is to be noted that the example where each mesa portion of the two-dimensional array 100 has a circular shape is explained in the foregoing embodiment, but the present invention is not restricted thereto, and each mesa portion may have an arbitrary shape, e.g., an elliptic shape, a square shape, or a rectangular shape.

Although the example where the number of the light emitters constituting one light emitter row is 10 and the number of the light emitter rows is four is explained in the foregoing embodiment, the present invention is not restricted thereto. Satisfying a relationship "the number of the light emitters constituting one light emitter row">"the number of the light emitter rows" can suffice.

Although the example where the light emitter interval c is 4.4 micrometers is explained in the foregoing embodiment, the present invention is not restricted thereto.

In the foregoing embodiment, the example where the light emitter interval d is 44.0 micrometers is explained, but the present invention is not restricted thereto.

In the foregoing embodiment, as shown in FIGS. 13 to 16, for example, a two-dimensional array 200 having a structure where materials of some of the semiconductor layers in the two-dimensional array 100 are changed may substitute for the two-dimensional array 100. According to this two-dimensional array 200, a spacer layer 213 substitutes for the spacer layer 113 in the two-dimensional array 100, an active layer 214 substitutes for the active layer 114 in the same, and a spacer layer 215 substitutes for the spacer layer 115 in the same.

The spacer layer 213 is a layer formed of $(Al_{0.7}Ga_{0.3})_{0.5}In_{0.5}P$ as a wide band gap.

As shown in FIG. 15, the active layer 214 has a GaInPas quantum well layer 214a formed of three layers each having a composition allowing a compression strain to remain and a band gap wavelength of 780 nanometers, and a $Ga_{0.6}In_{0.4}P$ barrier layer 214b having a tensile strain of four layers matched in lattice.

The spacer layer 215 is a layer formed of $(Al_{0.7}Ga_{0.3})_{0.5}In_{0.5}P$ as a wide band gap.

A part including the spacer layer 213, the active layer 214, and the spacer layer 215 is called a resonator structure, and its width is set to become a one-wavelength optical thickness (see FIG. 15).

Because an AlGaInP-based material is used for the spacer layer in this two-dimensional array 200, an extremely large band gap difference between the spacer layer and the active layer can be assured as compared with the two-dimensional array 100 in the foregoing embodiment.

FIG. 16 depicts a band gap difference between a spacer layer and a quantum well layer and a band gap difference between a barrier layer and the quantum well layer with typical material compositions in a VCSEL having a structure where the spacer layer/the quantum well layer is made of an AlGaAs/AlGaAs-based material and a wavelength belongs to a band of 780 nanometers (hereinafter, "VCSEL_A" for convenience's sake) the spacer layer/the quantum well layer is made of an AlGaInP/GaInPAs-based material and a wavelength belongs to a band of 780 nanometers (hereinafter, "VCSEL_B" for convenience's sake) and a VCSEL having a structure where the spacer layer/the quantum well layer is made of an AlGaAs/GaAs-based material and a wavelength belongs to a band of 850 nanometers (hereinafter, "VCSEL_C" for convenience's sake). It is to be noted that the VCSEL_A corresponds to the VCSEL 101 in the two-dimensional array 100, and the VCSEL_B when x=0.7 corresponds to the VCSEL 201 in the two-dimensional array 200.

According to this structure, it can be understood that a larger band gap difference can be assured in the VCSEL_B than those in the VCSEL_A and the VCSEL_C. Specifically, the band gap difference between the spacer layer and the quantum well layer in the VCSEL_B is 767.3 megaelectron volts and extremely higher than 465.9 megaelectron volts in the VCSEL_A. Likewise, the band gap difference between the barrier layer and the quantum well layer in the VCSEL_B is superior, and excellent carrier entrapment can be achieved.

Because the quantum well layer in the VCSEL 201 has a compression strain, an increase in a gain is accelerated due to band separation of a heavy hole and a light hole, resulting in a high gain. Therefore, a high output can be attained with a low threshold value. Accordingly, a reflection factor of the reflecting mirror on a light fetch side (upper reflecting mirror 117 in this example) can be reduced, thereby achieving a higher output. Because a high gain can be obtained, a reduction in a light output due to an increase in a temperature can be suppressed, thereby further narrowing an interval between the respective VCSELs in the two-dimensional array.

Because both the quantum well layer 214a and the barrier layer 214b in the VCSEL 201 are made of materials containing no aluminum (Al), an amount of fetching oxygen into the active layer 214 can be reduced. As a result, formation of a non-radiative recombination center can be suppressed, thereby attaining a long life duration.

Meanwhile, when using the two-dimensional array of the VCSELs in a so-called writing optical unit, the writing optical unit is disposable if a life duration of each VCSEL is short. However, because the VCSEL 201 has a long life duration as explained above, the writing optical unit using the two-dimensional array 200 is reusable. Therefore, resource protection can be promoted, and an environmental load can be reduced. It is to be noted that this can be applied to other devices using the two-dimensional array including the VCSELs.

It is to be noted that the example where the wavelength of the laser beam emitted from each light emitter belongs the band of 780 nanometers is explained in the foregoing embodiment, but the present invention is not restricted thereto, and a wavelength associated with sensitivity characteristics of the photosensitive drum 901 can suffice. It is to be noted that, in this case, at least a part of the material constituting each light emitter or at least a part of a structure of each light emitter is changed in accordance with an oscillation wavelength.

Figure 17A:
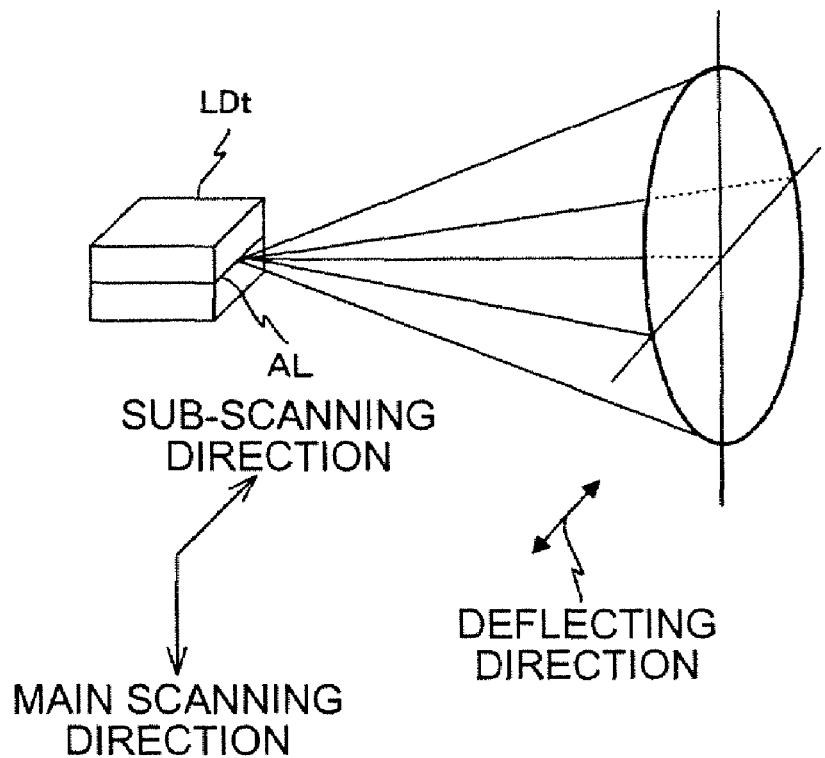
FIG. 17A and FIG. 17B are views for explaining light flux emitted from a facet emitting laser.
Figure 17B:
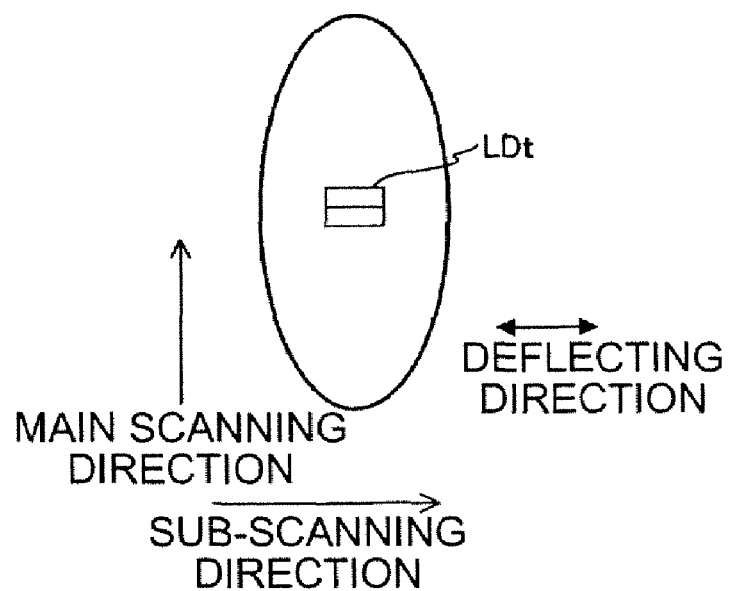

Meanwhile, as explained above, because a light output in the VCSEL is smaller than that in the facet emitting laser, the light utilization efficiency must be increased as much as possible. As shown in FIGS. 17A and 17B, in a facet emitting laser LDt, a direction parallel to an active layer AL is determined as a polarizing direction. In the scanning unit using the facet emitting laser LDt, a direction vertical to the active layer AL where a divergence angle becomes large is determined as a main scanning direction. Therefore, in the scanning unit using the facet emitting laser, the polarizing direction necessarily becomes a sub-scanning direction. On the other hand, a diverging beam of the VCSEL has a substantially circular shape. Therefore, in the scanning unit using the two-dimensional array of the VCSELs, when the two-dimensional array of the VCSELs is arranged in such a manner that an angle formed between the polarizing direction and the main scanning direction becomes larger than an angle formed between the polarizing direction and the sub-scanning direction, (1) a transmission factor obtained by using a soundproof glass can be improved, (2) a transmission factor obtained by using a scanning lens can be improved, and (3) a transmission factor obtained by using a dustproof glass can be improved, thereby enhancing the light utilization efficiency without changing a beam diameter. In particular, in the scanning unit having the soundproof glass or the dustproof glass provided therein, the effect is immeasurable. When the scanning optical system has a folded mirror, a reflection factor of the folded mirror can be improved.

FIG. 18 depicts each light utilization efficiency with an image height at an outmost periphery on a side of each optical element close to the light source (upper side in the page of FIG. 2) when the polarizing direction is matched with the main scanning direction and when the polarizing direction is matched with the sub-scanning direction. The light utilization efficiency when the polarizing direction is matched with the main scanning direction is higher than that when the polarizing direction is matched with the sub-scanning direction except the polygon mirror.

It is to be noted that the example where the laser printer 500 is used as an image forming apparatus is explained in the foregoing embodiment, but the present invention is not restricted thereto. In short, a high-quality image can be formed at a high speed if an image forming apparatus including the scanning unit 900 is used.

Even if an image forming apparatus that forms a color image is used, utilizing the scanning unit compatible with a color image enables forming a high-quality image at a high speed.

As shown in FIG. 19, a tandem color machine that is compatible with a color image and includes a plurality of photosensitive drums may be adopted as the image forming apparatus, for example. The tandem color machine depicted in FIG. 19 includes a photosensitive drum K1 for black (K), a charger K2, a developing unit K4, a cleaning unit K5, a transfer charging unit K6, a photosensitive drum C1 for cyan (C), a charger C2, a developing unit C4, a cleaning unit C5, a transfer charging unit C6, a photosensitive drum M1 for magenta (M), a charger M2, a developing unit M4, a cleaning unit M5, a transfer charging unit M6, a photosensitive drum Y1 for yellow (Y), a charger Y2, a developing unit Y4, a cleaning unit Y5, a transfer charging unit Y6, the scanning unit 900, a transfer belt 80, a fixing unit 30, and others.

In this example, a plurality of light emitters in the light source 14 are divided according to respective colors, i.e., black, cyan, magenta, and yellow in the scanning unit 900. The photosensitive drum K1 is irradiated with light fluxes from the respective light emitters for black, the photosensitive drum C1 is irradiated with light fluxes from the respective light emitters for cyan, the photosensitive drum M1 is irradiated with light fluxes from the respective light emitters for magenta, and the photosensitive drum Y1 is irradiated with light fluxes from the respective light emitters for yellow. It is to be noted that the scanning unit 900 may include each two-dimensional array 100 (or each two-dimensional array 200) for each color. It may include each scanning unit 900 for each color.

The respective photosensitive drums rotate in a direction indicated by arrows in FIG. 19, and the chargers, the developing units, the transfer charging units, and the cleaning units are arranged in the rotation order. Each charger uniformly electrostatically charges a surface of each corresponding photosensitive drum. The surface of the photosensitive drum charged by this charger is irradiated with light fluxes by the scanning unit 900, thereby forming an electrostatic latent image on the photosensitive drum. The corresponding developing unit forms a toner image on the surface of the photosensitive drum. The corresponding transfer charging unit transfers the toner image of each color onto a recording paper sheet, and each fixing unit 30 fixes the image on the recording paper sheet.

A color shift of each color may occur due to a mechanical accuracy in the tandem color machine in some cases. However, because the scanning unit 900 has the two-dimensional array including the VCSELs at a high density, selecting a VCSEL to be turned on enables increasing a correction accuracy for the color shift of each color.

An image forming apparatus using a silver salt film as an image carrier may be utilized. In this case, a latent image is formed on the silver salt film based on light scanning, and this latent image can be visualized by processing equivalent to development processing in a regular silver salt photographic process. Then, the image can be transferred onto a photographic printing paper sheet by processing equivalent to photographic printing processing in the regular silver salt photographic process. Such an image forming apparatus can be carried out as an optical plate-making apparatus or an optical drawing apparatus, which draws, e.g., a CT scan image.

An image forming apparatus using a coloring medium (positive photographic printing paper sheet) that forms a color based on a thermal energy of a beam spot as an image carrier may be also adopted. In this case, a visible image can be directly formed on the image carrier based on light scanning.

As explained above, the scanning unit of the present invention is suitable for improving the light utilization efficiency. The image forming apparatus is suitable for forming a high-quality image at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanning unit that scans a scanning target surface by using light fluxes, the scanning unit comprising:
   a light source having a plurality of surface emitting lasers;
   a deflector that deflects light fluxes output by the light source; and
   an optical system that is arranged in an optical path between the light source and the deflector, and includes a first optical system that leads the light fluxes output by the light source to the deflector and a second optical system that leads the light fluxes deflected by the deflector to the scanning target surface,
   wherein an absolute value of a lateral magnification in a main scanning direction is larger than an absolute value of a lateral magnification in a sub-scanning direction in the optical system, and
   a beam diameter in the sub-scanning direction on the scanning target surface is equal to or smaller than a beam diameter in the main scanning direction on the same and larger than a scan line interval.

2. The scanning unit according to claim 1, wherein the surface emitting lasers are arranged in a two-dimensional array where M (M≧2) surface emitting lasers are arranged along a first direction corresponding to the sub-scanning direction and N(N>M) surface emitting lasers are arranged along a third direction that makes a tilt angle with respect to a second direction corresponding to the main scanning direction toward the first direction, and
   intervals between the surface emitting lasers when the surface emitting lasers are orthogonally projected onto a virtual line extending in the first direction are equal.

3. The scanning unit according to claim 2, wherein the first optical system includes
   a coupling lens that converts the light fluxes output by the light source into a substantially parallel light;
   an aperture plate having an opening that defines a beam diameter of the light fluxes traveling through the coupling lens; and
   an image forming lens that forms an image of the light fluxes transmitted through the opening in the sub-scanning direction near the deflector, and
   a focal distance of the coupling lens is longer than an optical path length between the coupling lens and the aperture plate.

4. The scanning unit according to claim 2, wherein at least one of surface emitting lasers arranged at outermost positions on a periphery in the two-dimensional arrangement in the surface emitting lasers has a light emission amount larger than those of the other surface emitting lasers.

5. An image forming apparatus comprising:
   at least one image carrier; and
   at least one scanning unit according to claim 1 for scanning a surface of the image carrier with light flux.

6. The image forming apparatus according to claim 5, wherein the image information is color image information.

7. A scanning unit that scans a scanning target surface by using light fluxes, the scanning unit comprising:
   a light source having a plurality of surface emitting lasers each emitting a linearly polarized light flux;
   a deflector that defects the light fluxes output by the light source; and
   an optical system that is arranged in an optical path between the light source and the deflector, and includes a first optical system that leads the light fluxes output by the light source to the deflector and a second optical system that leads the light fluxes deflected by the deflector to the scanning target surface, wherein an absolute value of a lateral magnification in a main scanning direction is larger than an absolute value of a lateral magnification in a sub-scanning direction in the optical system, and an angle between a polarizing direction for the linear polarized light and the main scanning direction is larger than an angle between the polarizing direction of the linear polarized light and the sub-scanning direction.

8. The scanning unit according to claim 7, wherein the surface emitting lasers are arranged in a two-dimensional array where M (M≧2) surface emitting lasers are arranged along a first direction corresponding to the sub-scanning direction and N (N>M) surface emitting lasers are arranged along a third direction that makes a tilt angle with respect to a second direction corresponding to the main scanning direction toward the first direction, and intervals between the surface emitting lasers when the surface emitting lasers are orthogonally projected onto a virtual line extending in the first direction are equal.

9. The scanning unit according to claim 8, wherein the first optical system includes a coupling lens that converts the light fluxes output by the light source into a substantially parallel light;

an aperture plate having an opening that defines a beam diameter of the light fluxes traveling through the coupling lens; and an image forming lens that forms an image of the light fluxes transmitted through the opening in the sub-scanning direction near the deflector, and a focal distance of the coupling lens is longer than an optical path length between the coupling lens and the aperture plate.

10. The scanning unit according to claim 8, wherein at least one of surface emitting lasers arranged at outermost positions on a periphery in the two-dimensional arrangement in the surface emitting lasers has a light emission amount larger than those of the other surface emitting lasers.

* * * * *